(12) United States Patent
de Cremoux (10) Patent No.: US 10,170,980 B2
(45) Date of Patent: Jan. 1, 2019

(54) METHOD FOR SYNCHRONIZING POWER CHARGE-PUMP WITH SYSTEM CLOCK

(71) Applicant: Dialog Semiconductor (UK) Limited, Reading (GB)

(72) Inventor: Guillaume de Cremoux, Edinburgh (GB)

(73) Assignee: Dialog Semiconductor (UK) Limited, Reading (GB)

( * ) Notice: Subject to any disclaimer, the term of this patent is extended or adjusted under 35 U.S.C. 154(b) by 137 days.

(21) Appl. No.: 14/792,855

(22) Filed: Jul. 7, 2015

(65) Prior Publication Data
US 2017/0012522 A1   Jan. 12, 2017

(51) Int. Cl.
*H03L 7/06* (2006.01)
*H02M 3/07* (2006.01)

(52) U.S. Cl.
CPC ..................... *H02M 3/07* (2013.01)

(58) Field of Classification Search
CPC ..... A61B 5/073; A61B 5/6861; A61B 5/4839; A61N 1/37205
See application file for complete search history.

(56) References Cited

U.S. PATENT DOCUMENTS

| | | | |
|---|---|---|---|
| 5,319,254 A | 6/1994 | Goetting | |
| 6,031,402 A | 2/2000 | Wang et al. | |
| 6,177,959 B1 | 1/2001 | Bril | |
| 7,010,713 B2 | 3/2006 | Roth et al. | |
| 7,225,419 B2 | 5/2007 | Behnen et al. | |
| 2007/0247214 A1 | 10/2007 | Lin et al. | |
| 2008/0136805 A1* | 6/2008 | Kawagoshi | G09G 3/3696 345/211 |
| 2009/0189681 A1* | 7/2009 | Ivanov | H02M 3/07 327/536 |
| 2013/0057530 A1* | 3/2013 | Han | G09G 3/3696 345/211 |

OTHER PUBLICATIONS

U.S. Appl. No. 14/468,588, filed Aug. 26, 2014, "Digital Pulse Skipping Modulation for Buck Converter with Auto-Transition to Pulse Frequency Modulation (PRM)," by Guillaume De Cremoux, 32 pgs.

* cited by examiner

*Primary Examiner* — Sibin Chen
(74) *Attorney, Agent, or Firm* — Saile Ackerman LLC; Stephen B. Ackerman (57) ABSTRACT

The proposed Power Management Integrated Circuit (PMIC) features the option to synchronize the charge-pump of a PMIC with the system clock, and then to swap and self-oscillate and skip pulses, when the digital controls of the PMIC send a first order to the charge-pump. The clock control circuitry of the PMIC also features the option for the charge-pump to then swap and use the system clock again, when the digital controls of the PMIC send a second order to the charge-pump. The designed transition of the clock from clock sync-mode to self-oscillate, and from self-oscillate back to clock sync-mode, does not present any phase discontinuity.

13 Claims, 14 Drawing Sheets

METHOD FOR SYNCHRONIZING POWER CHARGE-PUMP WITH SYSTEM CLOCK

RELATED PATENT APPLICATION

This application is related to U.S. patent application Ser. No. 14/468,588, filed on Aug. 26, 2014, which is assigned to a common assignee, and is herein incorporated by reference in its entirety.

FIELD

The present disclosure relates generally to power management integrated circuits and more specifically to charge pump circuits.

BACKGROUND

There is a need for multiple clocks in today's digital circuitry, especially in power management integrated circuits. It is often necessary to switch the source of a clock line while the circuit is running. This may be implemented by multiplexing different frequency clock sources in the hardware, controlling the multiplexer select line by the internal logic. The clock frequencies may be totally unrelated to each other or they may be multiples of each other.

U.S. Pat. No. 7,225,419 (Behnen, et al.) describes a method that includes the steps of (1) receiving a circuit design having a plurality of latches; and (2) allowing one or more latches of the circuit design to be locally treated as exhibiting latch transparency during modeling of the timing behavior of the circuit design. Numerous other aspects are provided.

U.S. Pat. No. 5,319,254 (Goetting) shows a latch that may be formed as a two-part structure, one part for data input and one part for feeding back the data to form the latch. A clock signal controls whether data from a data input terminal would be forwarded to the output or whether the output signal will be provided as input and forwarded, thus forming the latch. A problem called the static ones hazard, namely registering a logical 0 when data input is logical 1, can occur with a latch of this logic structure when the circuit is entering the latch mode. In accordance with the invention, this static ones hazard is avoided by controlling trip points in the gates of the cell and input buffers of the cell so that the cell implements a make-before-break transition.

U.S. Pat. No. 7,010,713 (Roth, et al.) describes a synchronization circuit for re-synchronizing data from an input clock to an output clock. The first transparent latch receives data synchronized to an input clock. A second transparent latch receives data from the first transparent latch and outputs data dependent on a delayed output clock, which is the output clock delayed by an insertion delay. An output latch receives data from the second transparent latch and synchronizes data to the output clock.

Figure 1:
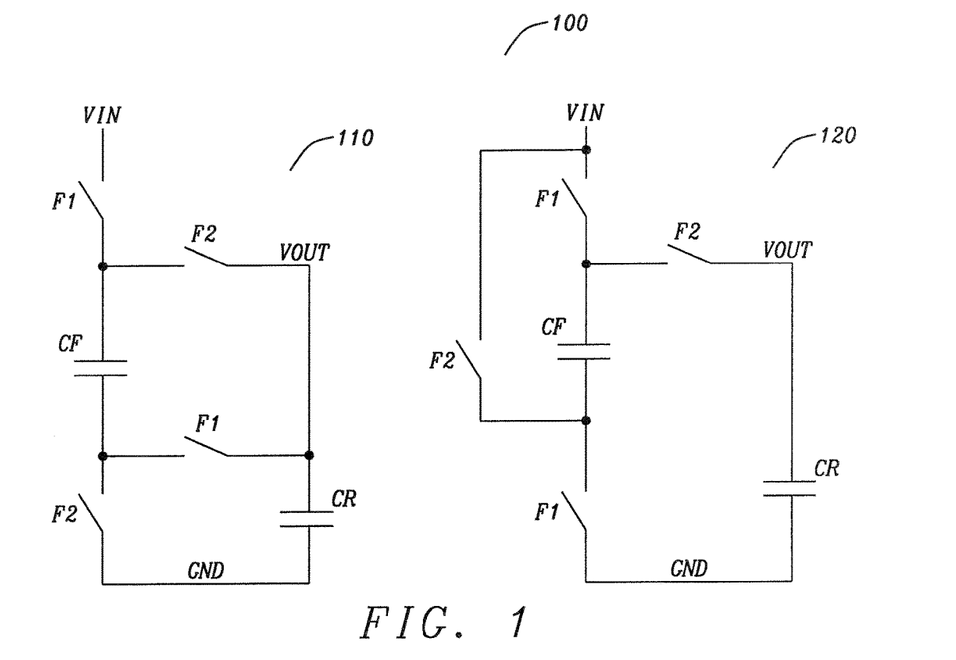
FIG. 1 shows two typical capacitive converters, a ½ down converter and a 2× up-converter.

FIG. 1 shows two typical capacitive converters, a ½ down converter 110 and a 2× up-converter 120, in charge-pump configurations of the related art. The charge-pumps comprise input signal VIN, output signal VOUT, capacitors CF and CR, and switches F1 and F2.

Figure 2:
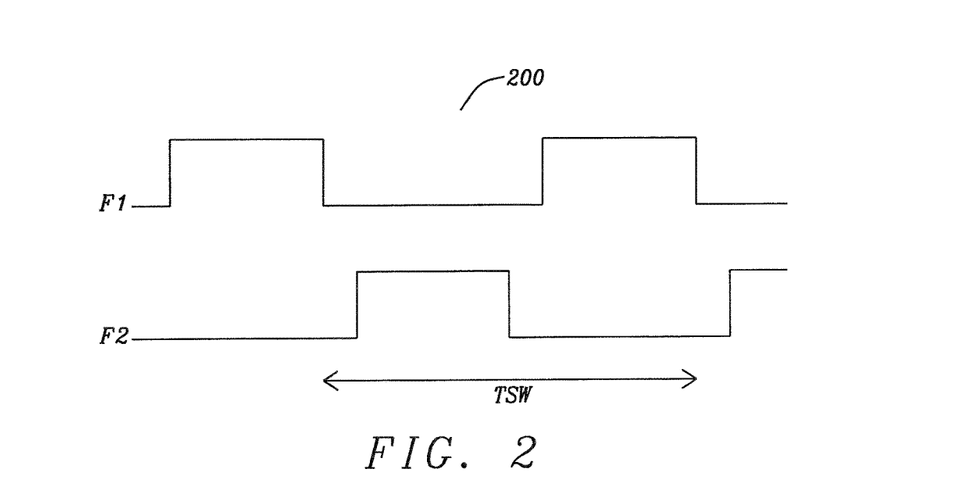
FIG. 2 illustrates a signal diagram for equal, and non-overlapping, phases of a charge-pump.

FIG. 2 illustrates a signal diagram for equal, and non-overlapping, phases of a charge-pump. The charge pump has two sets of switches, with signals that control their switching, and are denoted by phase F1 and F2. During phase F1, flying capacitor CF is discharged through the F1 switches, and during phase F2, through the F2 switches. These principles can be extended to N phase charge-pumps, the N phases being either equal ($2\pi/1, \ldots 2\pi/N$) or having different durations to optimize the CF discharge.

Figure 3:
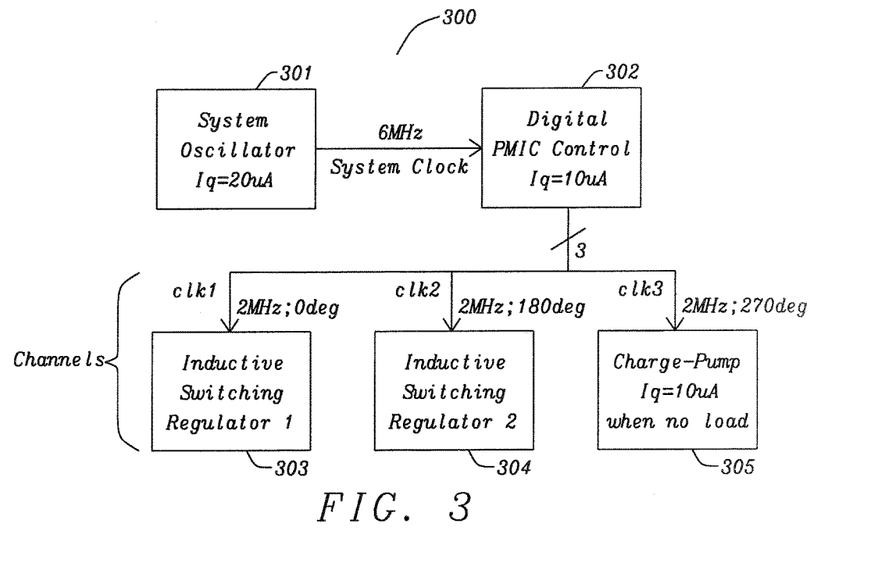
FIG. 3 shows a charge-pump integrated in a Power Management Integrated Circuit (PMIC) system with other capacitive/inductive converters.

FIG. 3 shows a charge-pump integrated in a Power Management Integrated Circuit (PMIC) system 300 with other capacitive/inductive converters. The channels 303, 304, and 305 are regulated power sources like buck converters or charge-pumps, taking their source from, for example a battery. The PMIC system comprises system oscillator 301 and digital control 302. Very often the application wants all the switching frequencies of the clock channels CLK1, CLK2, and CLK3 to be equal, for example 2 MHz, and placed in a well controlled channel for Electro Magnetic Interference (EMI) reasons. Further, the application also wants to control the phase of each channel. For example, one channel may be very noisy and may pollute the power rails common to other channels, triggering false detections. If the phases are separated with respect of the known operating points of each channel, then one channel can switch while the other ones do not, and remain unaffected. In addition, if there is any phase discontinuity in the switching, the flying capacitor CF in the FIG. 1 would not have the time to deliver its charge to the output, and VOUT would glitch.

SUMMARY

Accordingly, it is an object of one or more embodiments of the present disclosure to provide a circuit and a method for a glitch free clock switching mechanism for ensuring that logic and power can be safely switched from one clock to another without a glitch that would be interpreted by part of the digital logic differently than other parts of the same digital logic.

Accordingly, it is an object of one or more embodiments of the present disclosure to provide continuous phase of the self-oscillating clock with the master clock when the transition is made. This is accomplished with the phase detector and the sequencing of the time delays that constitute the self-oscillating clock.

It is a further object of one or more embodiments of the disclosure to provide charge-pump clock switching, without a glitch, and guaranteed continuous phase.

Other objects will appear hereinafter.

The above and other objects of the present disclosure may be accomplished in the following manner. The Power Management Integrated Circuit (PMIC) features the option to synchronize the charge-pump with the system clock, and then to swap and self-oscillate and skip pulses, when the digital controls of the PMIC send a first order to the charge-pump. The PMIC also features the option for the charge-pump to then swap and use the system clock again, when the digital controls of the PMIC send a second order to the charge-pump. The designed transition of the clock from clock sync-mode to self-oscillate, and from self-oscillate back to clock sync-mode, does not present any phase discontinuity.

BRIEF DESCRIPTION OF THE DRAWINGS

The present disclosure will be more clearly understood from the following description taken in conjunction with the accompanying drawings in which like reference numerals designate similar or corresponding elements, regions and portions and in which.

DESCRIPTION

The proposed Power Management Integrated Circuit (PMIC) features the option to synchronize the charge-pump of a PMIC with the system clock, and then to swap and self-oscillate and skip pulses, when the digital controls of the PMIC send a first order to the charge-pump. The clock control circuitry of the PMIC also features the option for the charge-pump to then swap and use the system clock again, when the digital controls of the PMIC send a second order to the charge-pump. The designed transition of the clock from clock sync-mode to self-oscillate, and from self-oscillate back to clock sync-mode, does not present any phase discontinuity.

Figure 4:
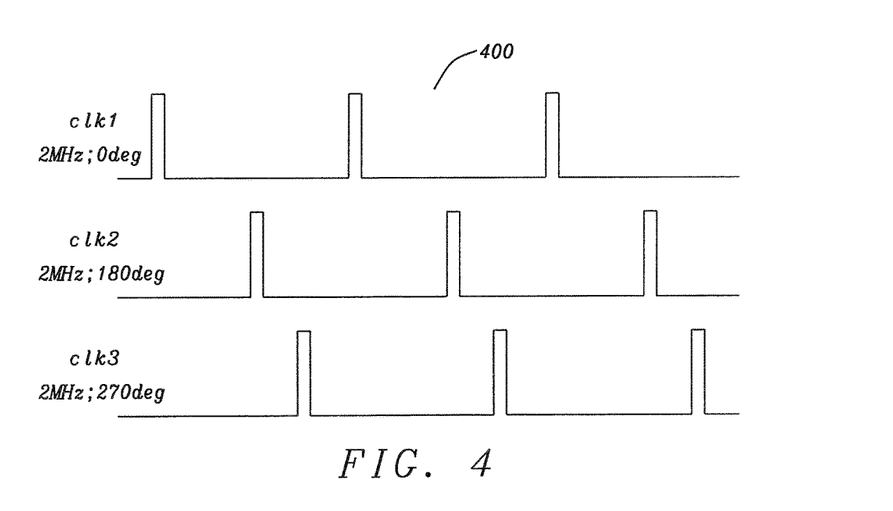
FIG. 4 illustrates a signal diagram for the phase control of three different clock channels of a Buck converter.

FIG. 4 illustrates a signal diagram example for the phase control of three different clock channels CLK1, CLK2, and CLK3 of a PMIC. Channel 1 CLK1 may be a Buck converter with a 40% duty-cycle. When channel 2 CLK2 is started with a 20% duty-cycle, channel 1 CLK1 has finished its operation. When channel 3 CLK3 is started, no other Buck converter needs to make a decision or detection. The advantages of having a well-controlled frequency and phase for the clocks of all the channels include the reduction of cross talk between channels and the reduction of electromagnetic interference.

Figure 5:
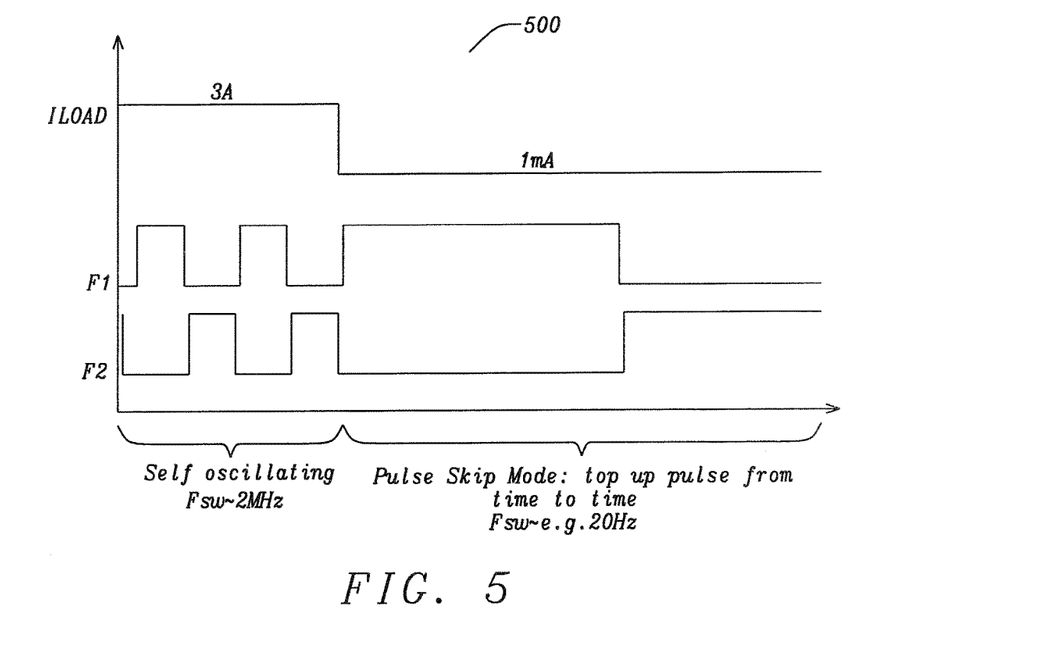
FIG. 5 shows a signal diagram for a charge-pump self-oscillating, with the capability to skip pulses, in a first preferred embodiment of the present disclosure.

FIG. 5 shows a signal diagram for a charge-pump self-oscillating, with the capability to skip pulses, in a first preferred embodiment of the present disclosure. This would occur when the PMIC system is in a low-power mode, when the charge-pump is active with a very light or zero load, represented by ILOAD. The charge-pump may consume up to 10 uA for its own control, and the system oscillator of the PMIC system and the digital controls may consume 20 uA+10 uA. When the PMIC system and digital controls are deactivated, the power consumption of the platform would be reduced. The charge-pump would remain active, and then generate its own oscillation. F1 and F2 represent the 2 phases of the charge-pump.

Figure 6:
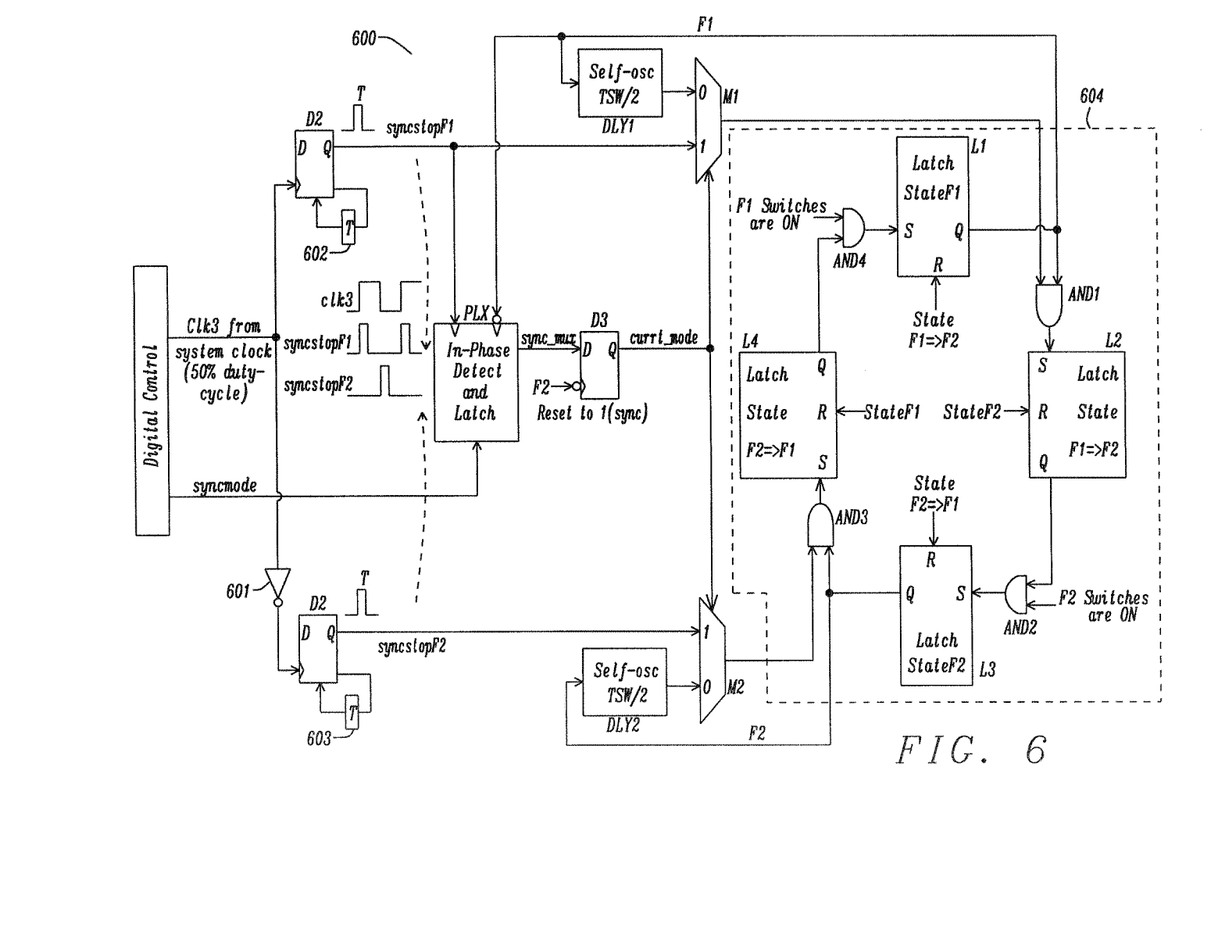
FIG. 6 illustrates a circuit diagram of the clock controls for sync-mode and self oscillation, in a first preferred embodiment of the present disclosure.

FIG. 6 illustrates a circuit diagram of the clock controls for sync-mode and self oscillation, of a first preferred embodiment of the present disclosure. Clock controls 600 illustrate CLK3 system clock with 50% duty-cycle, input to flip-flop D1 and inverted at 601 to the input of flip-flop D2, with delays T602 and T603 applied to reset the flip-flop D1 and D2, respectively. The clock controls comprise in-phase detect and latch PLX, with inputs SYNCMODE from the digital control, SYNCSTOPF1 from flip-flop D1, and phase F1, and output SYNC_MUX. The clock controls further comprise flip-flop D3 with inputs SYNC_MUX from PLX and inverted phase F2, and output CURRT_MODE. Multiplexers M1 and M2 receive input CURRT_MODE from D3, inputs SYNCSTOPF1 and SYNCSTOPF2 from flip-flops D1 and D2, and inputs from DLY1 and DLY2, delayed TSW/2 phase F1 and F2 signals, respectively. The clock controls further comprise state latch L1 for phase F1, state latch L3 for phase F2, state latch L2 for transition phase F1 to F2, and state latch L4 for transition phase F2 to F1. AND1 drives state latch L2, and has inputs phase F1 and the output of multiplexer M1. AND2 drives state latch L3, and has inputs phase F2 ON and the output of state latch L2. AND3 drives state latch L4, and has inputs phase F2 and the output of multiplexer M2. AND4 drives state latch L1, and has inputs phase F1 ON and the output of state latch L4. State latches L1, L2, L3, and L4, as well as AND circuits AND1, AND2, AND3, and AND4 comprise latching circuit 604.

CLK3 is generated from the digital control as a 50% duty-cycle, whose falling and rising edges are used by flip-flops D1 and D2, to generate pulses of the same frequency. The output of flip-flop D3, CURRT_MODE, and the output of in-phase detect and latch PLX, SYNC_MUX, are initially set to 1 by SYNCMODE being low. Multiplexers M1 and M2 select the pulses SYNCSTOPF1 and SYNCSTOPF2, respectively, issued from CLK3.

Figure 7:
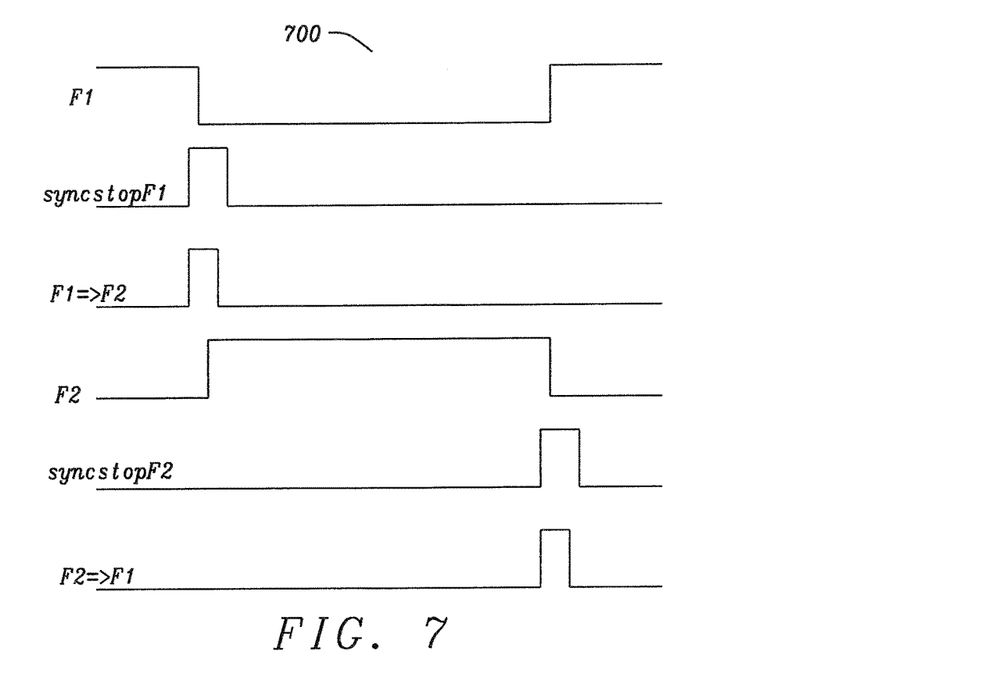
FIG. 7 shows a signal diagram for the PMIC system in sync mode, in a first preferred embodiment of the present disclosure.

FIG. 7 shows a signal diagram for the PMIC system in sync mode, in a first preferred embodiment of the present disclosure. When CLK3 rising edge SYNCSTOPF1 interrupts phase F1, state latch L2 has its output set, and it is used to deactivate the phase F1 power switches, and activate the phase F2 power switches. The signal output of state latch L2 is used to reset state latch L1, turning OFF phase F1. Once phase F2 power switches are detected ON, state latch L3 is set, and state latch L2 reset. The charge-pump is now in phase F2. CLK3 falling edge SYNCSTOPF2 then initiates state latch L4 for transition phase F2 to F1, which resets state latch L3 and sequences the power switches. The phase F2 switches are deactivated, and the phase F1 switches are reactivated. Once the phase F1 switches are detected ON, state latch L1 is set and state latch L4 reset. The charge-pump has completed a cycle and waits for SYNCSTOPF1 again, which comes TSW later.

The CLK3 50% duty-cycle is necessary to ensure the same phase F1 and F2 durations. This request can however be modified if needed for different durations of phase F1 and F2. For example, if the switches used for phase F1 are slightly more resistive than the switches used for phase F2, then it is preferable to have phase F1 during 60% of period TSW and phase F2 during 40% of period TSW. Also more phases can be inserted if needed, and the intermediate states for transition phase F1 to F2 and for transition phase F2 to F1 can be further split into sub-states. From this sync mode, the charge-pump can swap to self-oscillating, and vice versa.

Figure 8:
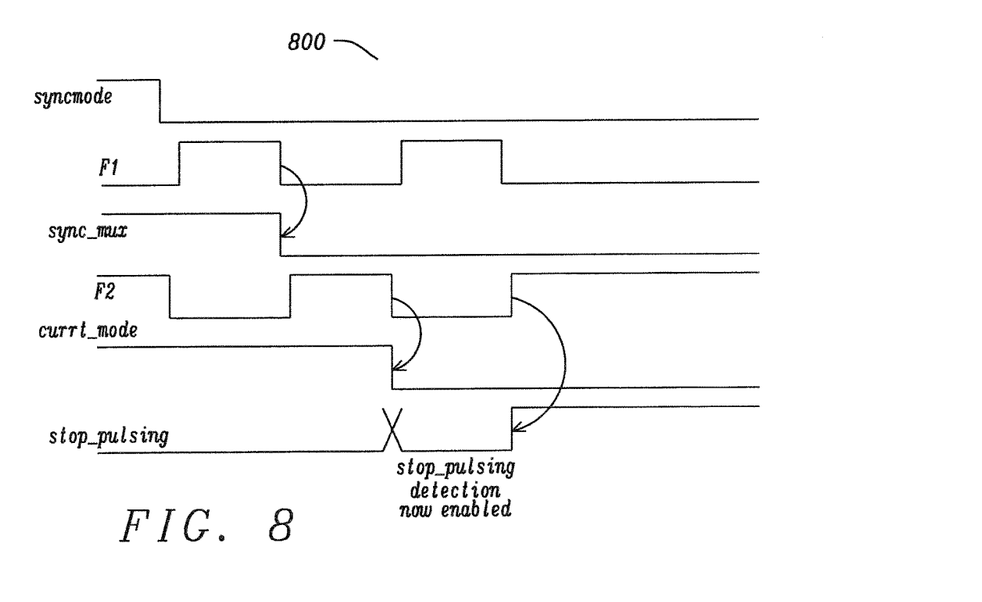
FIG. 8 shows a signal diagram for the PMIC system transitioning from sync-mode to self-oscillating, in a first preferred embodiment of the present disclosure.

FIG. 8 shows a signal diagram for the PMIC system transitioning from sync-mode to self-oscillating, in a first preferred embodiment of the present disclosure. The PMIC system issues the request to stop sync-mode, for example if the charge-pump load is light, and de-asserts SYNCMODE. This resets in-phase detect and latch PLX output SYNC_MUX, either spontaneously or on the phase F1 falling edge. Flip-flop D3 output CURRT_MODE swaps multiplexers M1 and M2 to self-oscillating at the moment their selected outputs are not needed by the PMIC system. The best option is at the end of a phase, for example at the end of phase F2. Phase F2 has ended and phase F1 has not yet started, and the power switches of the charge-pump are not using multiplexers M1 and M2. Once phase F2 goes down, CURRT_MODE samples SYNC_MUX and goes down too. Multiplexers M1 and M2 now use delayed TSW/2 signals of their phases F1 and F2, from DLY1 and DLY2 respectively. The PMIC system goes to phase F1, which lasts TSW/2 and then is terminated by the delay. The charge-pump no longer uses SYNCSTOPF1 and SYNCSTOPF2 and is self-oscillating. The charge pump may be subject to pulse skipping.

Figure 9:
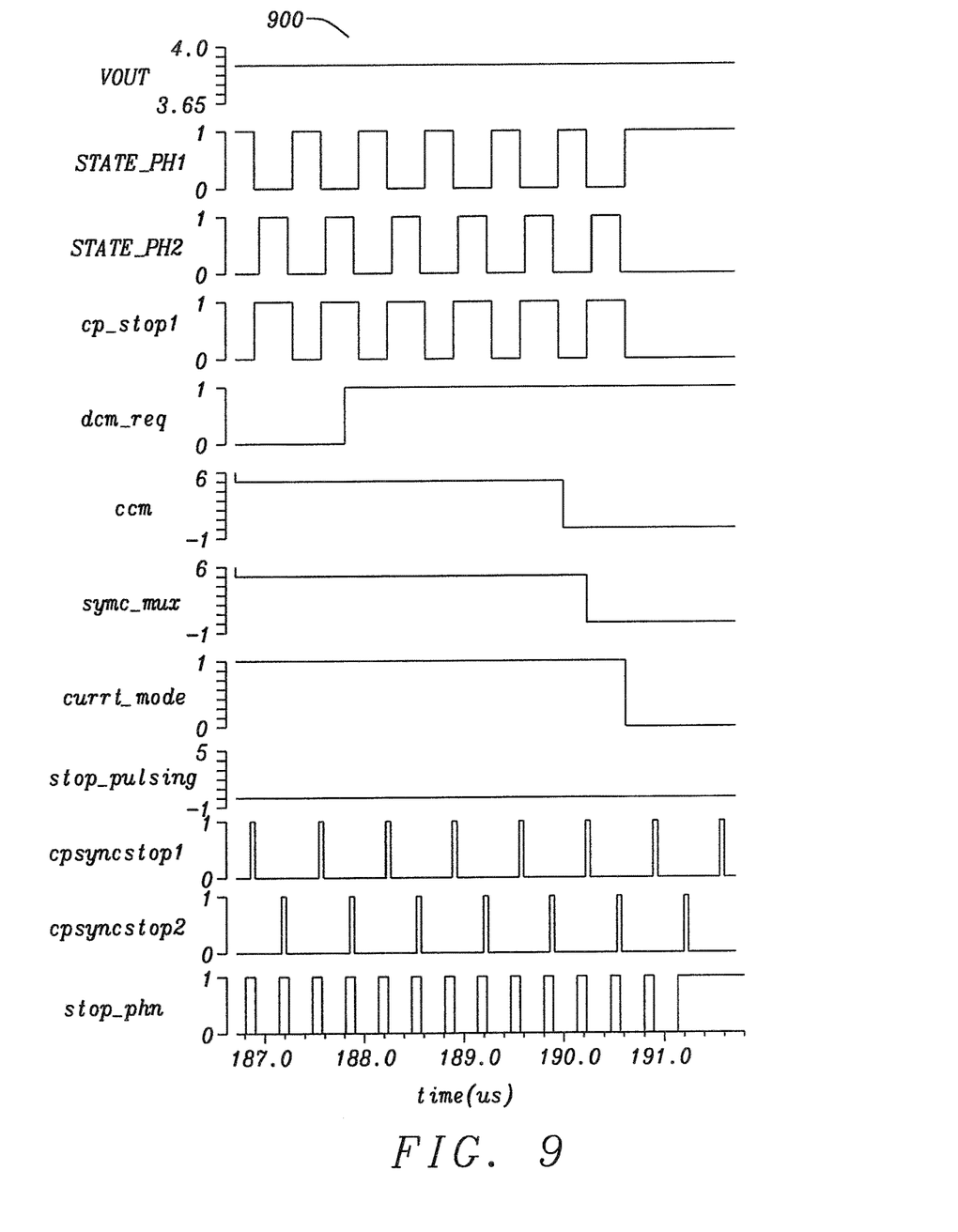
FIG. 9 illustrates the transient analysis of the simulated system, when the charge-pump begins to self-oscillate, in a first preferred embodiment of the present disclosure.

FIG. 9 illustrates the transient analysis of the simulated system, when the charge-pump begins to self-oscillate, in a first preferred embodiment of the present disclosure. DCM_REQ is issued and the PMIC system sends the request to stop sync-mode, if the charge-pump load is light. CCM/SYNCMODE is set to zero, and is reflected on the output of in-phase detect and latch PLX, SYNC_MUX. Flip-flop D3 samples SYNC_MUX on the phase F2/STATE_PH2 falling edge. The multiplexers M1 and M2 swap their inputs, and immediately, in this case, the pulses are skipped. Note that the PMIC system acknowledges CURRT_MODE zero. Only then, when the charge-pump is guaranteed to self-oscillate, the digital control of the PMIC system stops CLK3.

Figure 10:
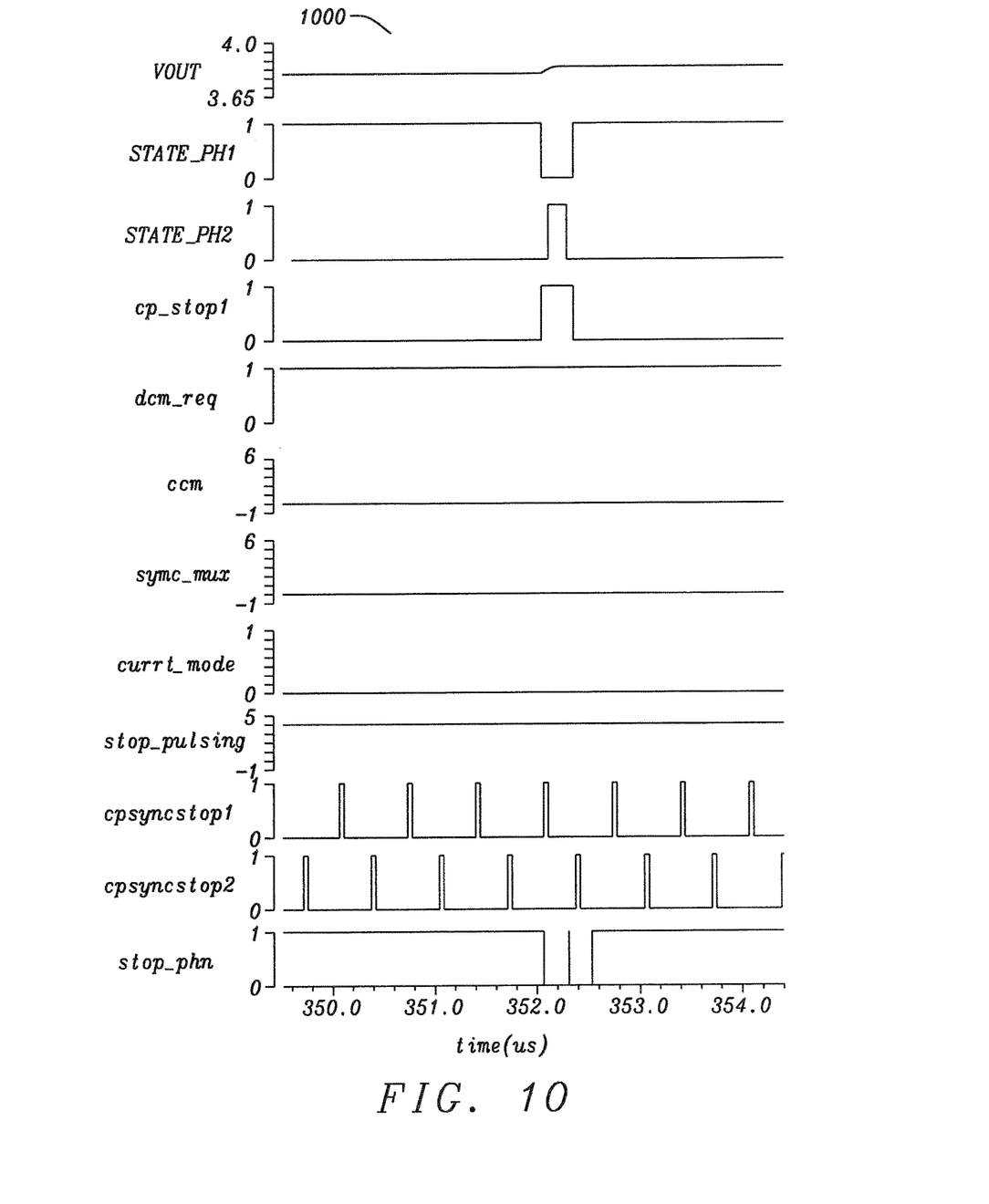
FIG. 10 illustrates the transient analysis of the simulated system, for the skip operation during self-oscillation, in a first preferred embodiment of the present disclosure.

FIG. 10 illustrates the transient analysis of the simulated system, for the skip operation during self-oscillation, in a first preferred embodiment of the present disclosure. From time to time, VOUT is detected a bit too low and the phases are swapped, which corresponds to CF injecting a charge to the output and pulling VOUT up. This corresponds to a time of 352.1 microseconds in the simulation.

Figure 11:
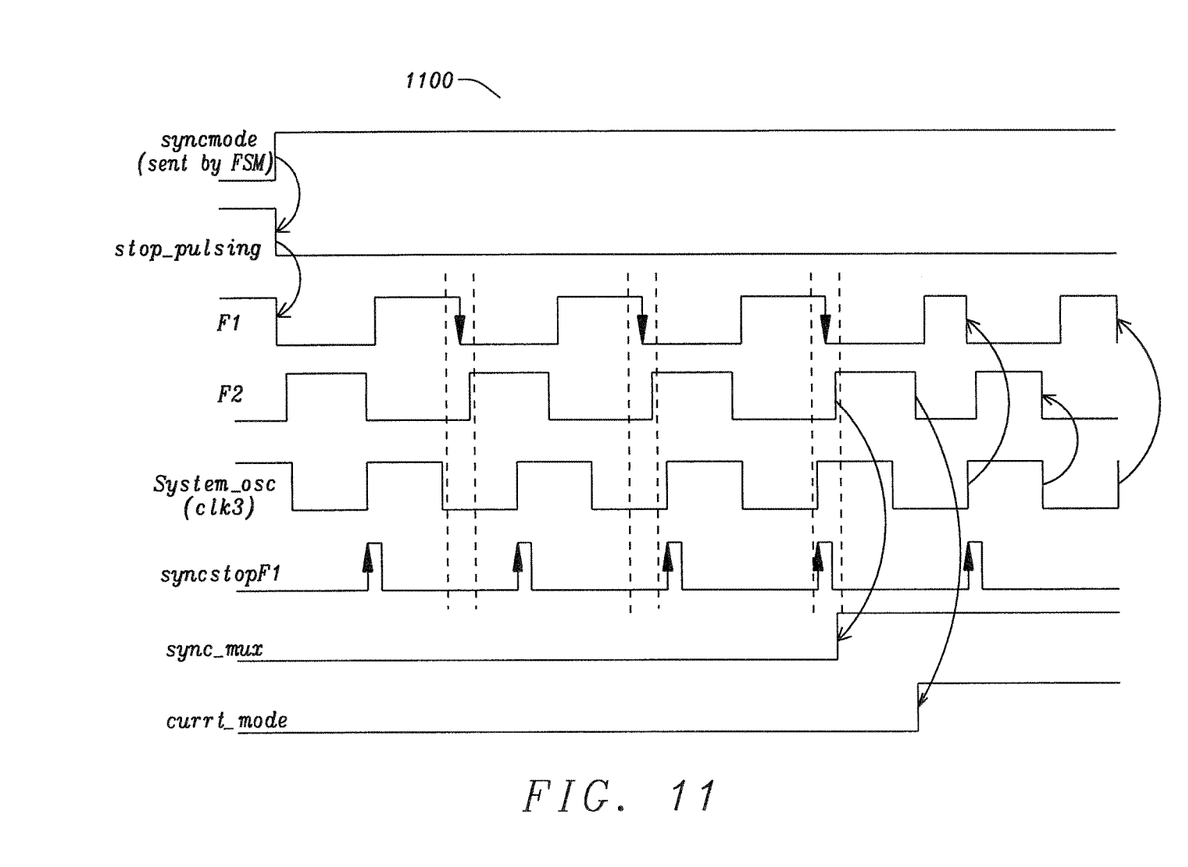
FIG. 11 shows a signal diagram for the PMIC system transitioning from self-oscillating to sync-mode, in a first preferred embodiment of the present disclosure.

FIG. 11 shows a signal diagram for the PMIC system transitioning from self-oscillating to sync-mode, in a first preferred embodiment of the present disclosure. When the whole platform of the PMIC system needs to operate, and therefore low EMI becomes a requirement, the system controls send to the charge-pump an order to re-synchronize on CLK3. SYNCMODE is set to 1 by the system controls to prevent the charge-pump from skipping pulses if its load is light. A constant frequency is indeed needed for further phase detection. This is reflected by the STOP_PULSING signal being forced low. The digital control has re-started CLK3, and SYNCSTOPF1 and SYNCSTOPF2 are constantly pulsing. Then in-phase detect and latch PLX uses the two signals SYNCSTOPF1 and phase F1 falling edge to compare their phases. As long as the phases are far enough apart, PLX does not set SYNC_MUX to 1, and the charge-pump is still self-oscillating.

However, once the phases cross within a time-tolerance window, shown in shadow, in-phase detect and latch PLX asserts the phase cross, and multiplexers M1 and M2 are swapped. Phase F1 is terminated by delay block DLY1, but may also have been terminated by SYNCSTOPF1, with little difference. Replacing the output of DLY1 by SYNCSTOPF1 does not give any phase jump or truncation. SYNCMUX is set to 1, and shortly after, on phase F2 falling edge, flip-flop D3 sets CURRT_MODE to 1. The charge-pump has swapped from self-oscillating to sync-mode, and is unaffected by the phase duration.

Figure 12:
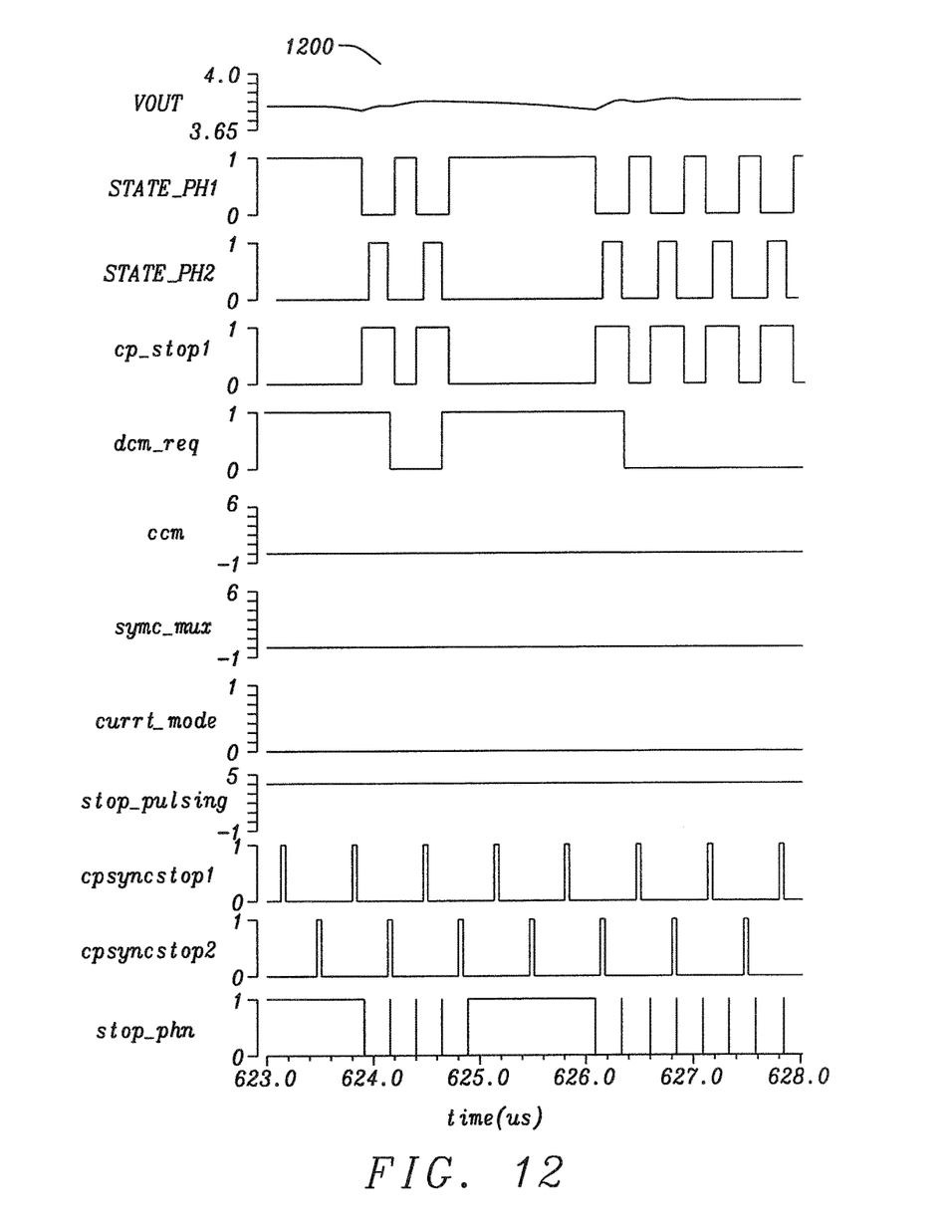
FIG. 12 illustrates the transient analysis of the simulated system, before the charge-pump ends self-oscillation, in a first preferred embodiment of the present disclosure.

FIG. 12 illustrates the transient analysis of the simulated system, before the charge-pump ends self-oscillation, in a first preferred embodiment of the present disclosure. During self-oscillation, the charge-pump load may increase, which leads to more pulses. The charge-pump can maintain its output at a high-load when VOUT is detected a bit too low and the phases are swapped, corresponding to CF injecting a charge to the output and pulling VOUT up. This corresponds to times 624 and 626.2 microseconds in the simulation.

Figure 13:
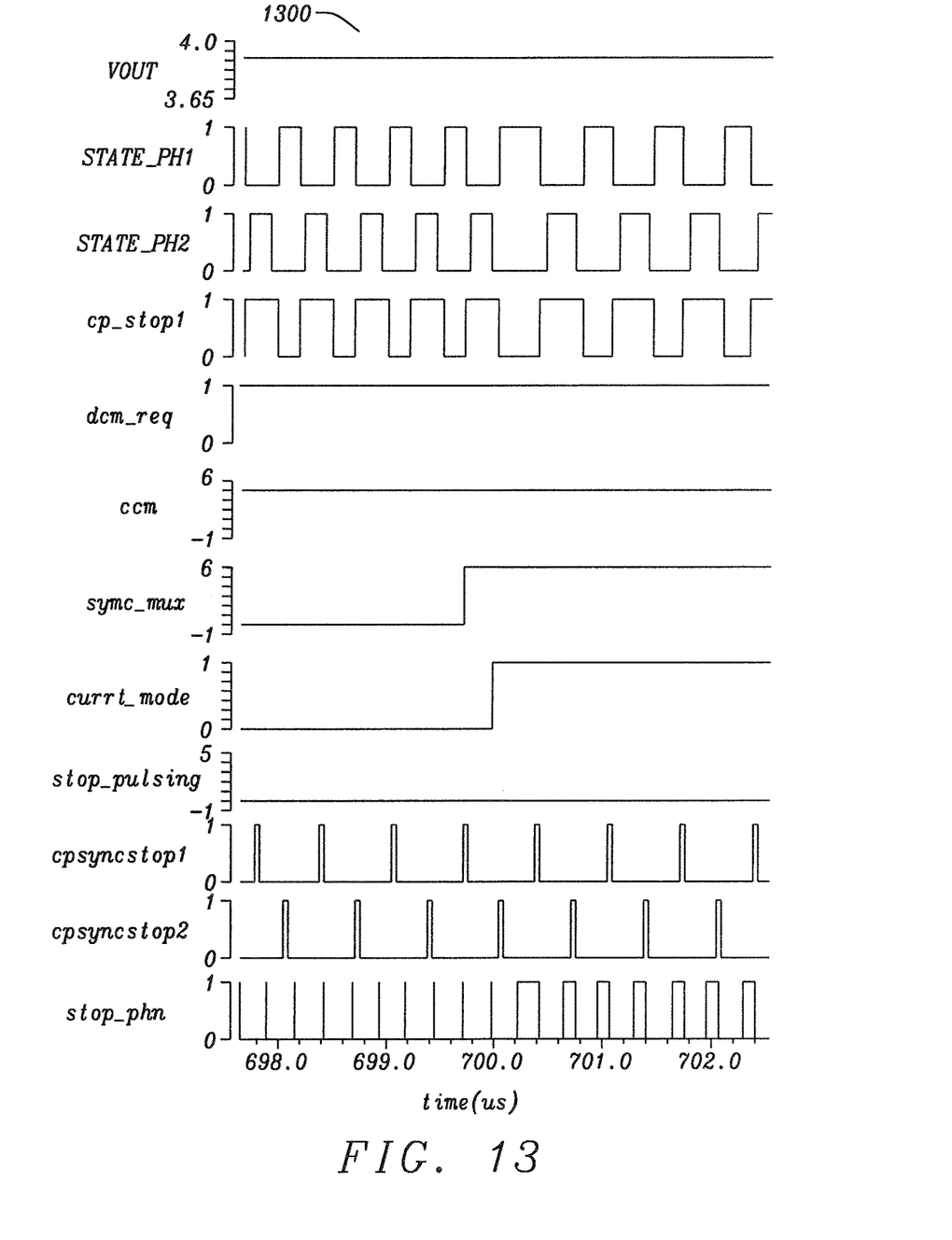
FIG. 13 illustrates the transient analysis of the simulated system, when the charge-pump begins to re-sync, in a first preferred embodiment of the present disclosure.

FIG. 13 illustrates the transient analysis of the simulated system, when the charge-pump begins to re-sync, in a first preferred embodiment of the present disclosure. Phase F1/STATE_PHI1 falling edge, and CPSYNCSTOP1/CP_STOP1 rising edges, slide versus each other. At 699.7 microseconds, the frequencies are close enough so that in-phase detect and latch PLX sets SYNC_MUX to 1, also seen on the output of flip-flop D3, CURRT_MODE. Once back in sync-mode, only CPSYNCSTOP1 and CPSYNCSTOP2 are used to stop phase F1 and phase F2. Delay block DLY1 and DLY2 outputs, STOP_PHN, have a longer time-out because they are not reset by the circuitry. Also instead of comparing phase F1 falling edge to CPSYNCSTOP1, phase F2 falling edge may be compared to CPSYNCSTOP2, or more generally phase FN falling edge to CPSYNCSTOPN to include more phases.

Figure 14:
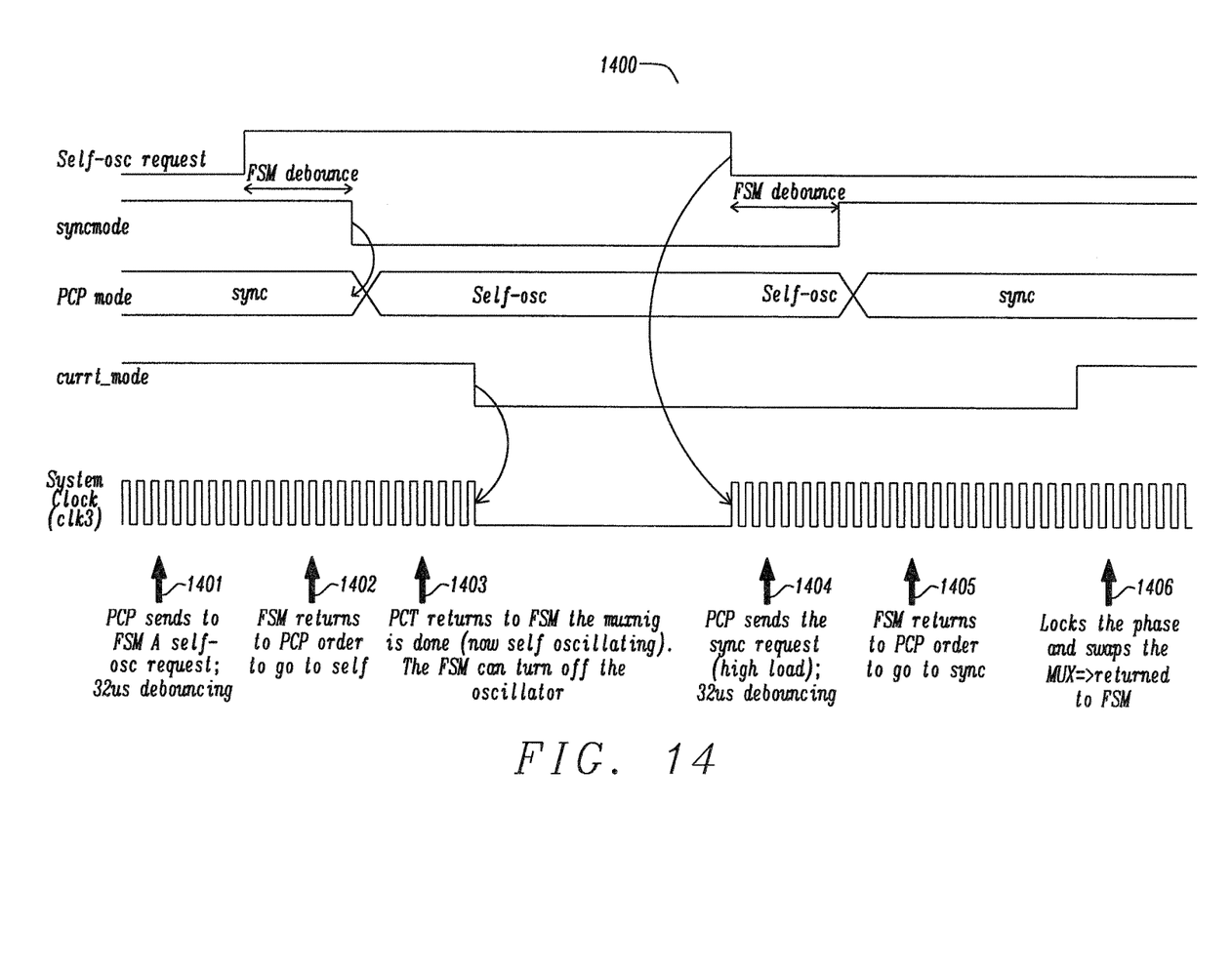
FIG. 14 shows a signal diagram of what the Finite State Machine (FSM) of the PMIC system does, in a first preferred embodiment of the present disclosure.

FIG. 14 shows a signal diagram of what the Finite State Machine (FSM) of the PMIC system does, in a first preferred embodiment of the present disclosure. There is a request from the digital control, or from the charge-pump itself when the load is light, to self-oscillate, in 1401. The digital control of the FSM debounces the request, and sets SYNCMODE to 0, in 1402. The charge-pump goes to self-oscillating and the digital control acknowledges this state by setting CURRT_MODE to 0, in 1403, and then can switch off the system clock to save power. When the charge-pump needs to be re-synchronized, the request is debounced again, and the digital control re-starts the oscillator, in 1404, setting SYNCMODE to 1, in 1405. The digital control acknowledges CURRT_MODE being set to 1, in 1406, and the charge-pump is synchronized back to CLK3.

Figure 15:
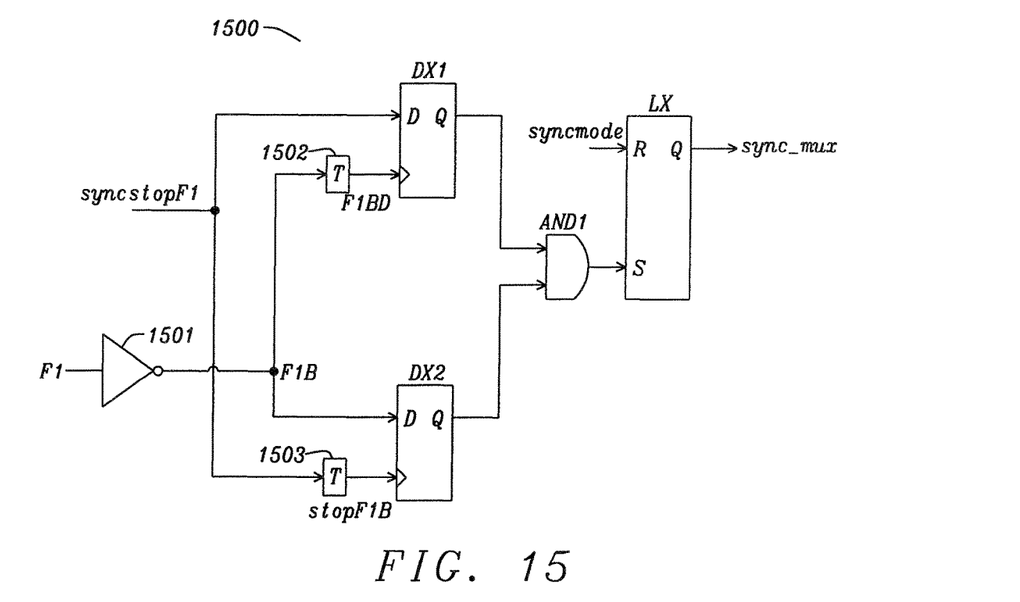
FIG. 15 shows a circuit diagram of a possible implementation of the PLX circuitry, for in-phase detect and latch.

FIG. 15 shows a circuit diagram of a possible implementation of the PLX circuitry, for the in-phase detect and latch. PLX circuitry 1500 comprises flip-flop DX1 with inputs SYNCSTOPF1 and F1 BD of delay T 1502, and flip-flop DX2 with inputs F1B and STOPF1B of delay T 1503. SYNCSTOPF1 also drives delay T 1503, and inverter 1501 receives phase F1, and drives input F1B. PLX circuitry further comprises AND1, with inputs driven by flip-flops DX1 and DX2, and latch LX, with inputs driven by SYNCMODE and AND1. The output of latch LX is SYNC_MUX. The small delays T give the tolerance, or time window in which, both the falling edge of phase F1 and the rising edge of SYNCSTOPF1 are found, and both signals are asserted to be in phase.

Figure 16:
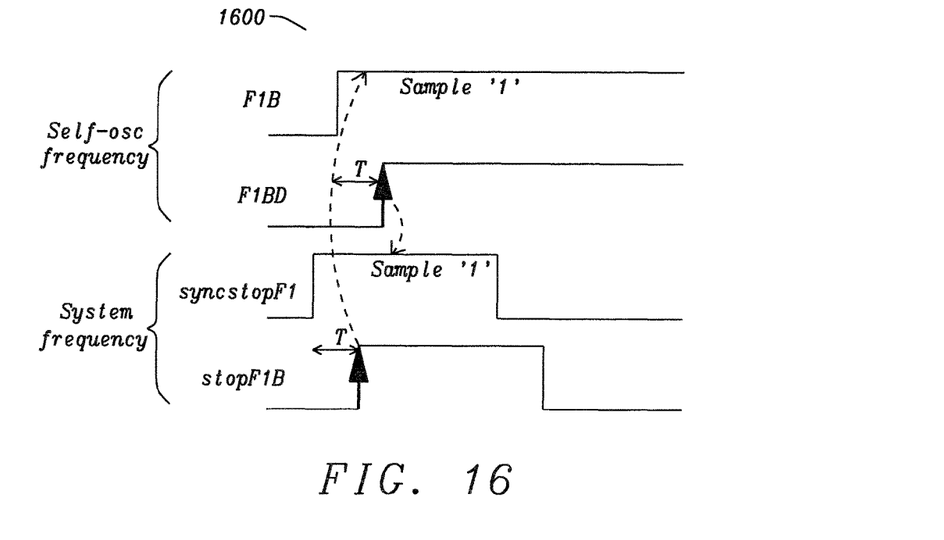
FIG. 16 illustrates a signal diagram for generating latch LX output for the PLX circuitry, for in-phase detection.

FIG. 16 illustrates a signal diagram for generating latch LX output SYNC_MUX for the PLX circuitry, for in-phase detection. The self-oscillating phase F1 is inverted into FIB, to compare the rising edges. It is delayed by T in F1 BD and used to sample signal SYNCSTOPF1 in flip-flop DX1. Similarly, SYNCSTOPF1 is delayed in STOPF1B and used to sample F1B in flip-flop DX2. If FIB and SYNCSTOP F1 rising edges are close by less than delay T, then both delayed signals F1 BD and STOPF1B set 1 on flip-flops DX1 and DX2. Using AND1, this generates a pulse that sets latch LX output SYNC_MUX to 1, only at the phase crossing within the tolerance delay T.

Figure 17:
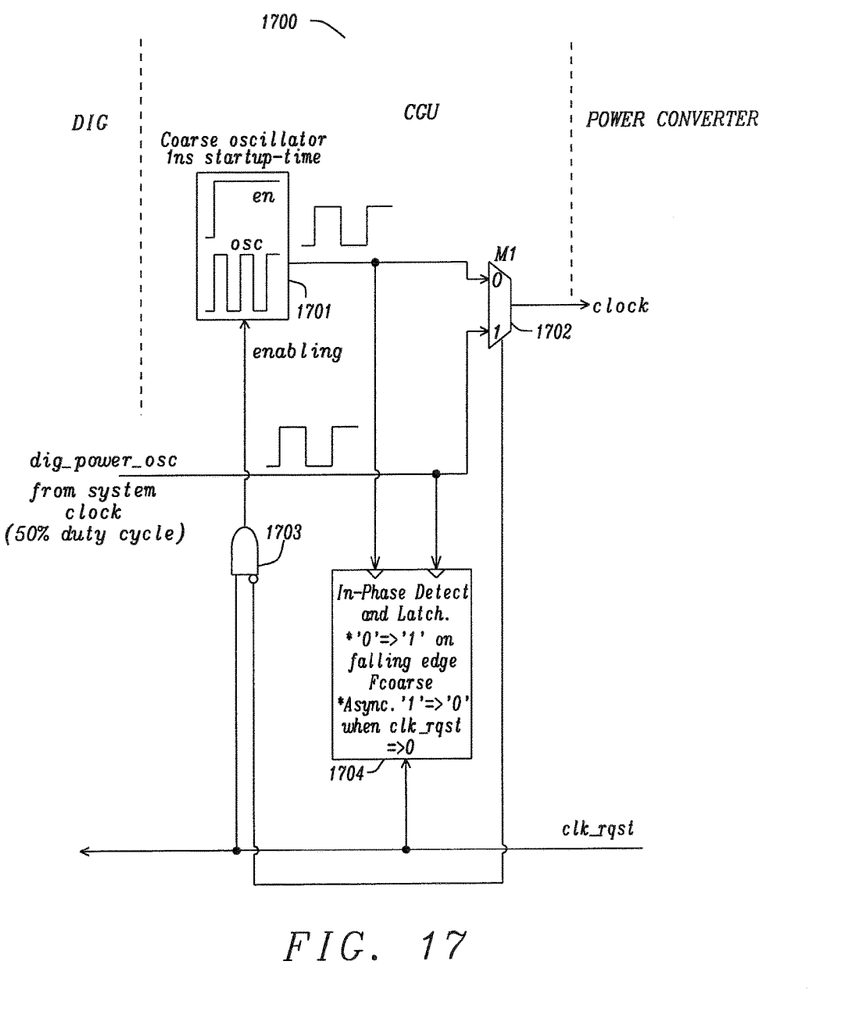
FIG. 17 illustrates a circuit diagram for a separate, fast starting coarse external oscillator for a Power converter.

FIG. 17 illustrates a circuit diagram for a separate, fast starting coarse external oscillator for a Power converter. In this case, the Power converter first uses a coarse external clock 1701, controlled by CLK_RQST transmitted through AND 1703. This gives time to generate the accurate system oscillator, and to program its phase and frequency using in-phase detect and latch PLX 1704. Later once the phase of this local oscillator crosses the phase of the DIG_POWER_OSC sent from the system clock, the multiplexer M1 1702 may swap the coarse external clock and use the DIG_POWER_OSC as its clock for the Power converter.

Figure 18:
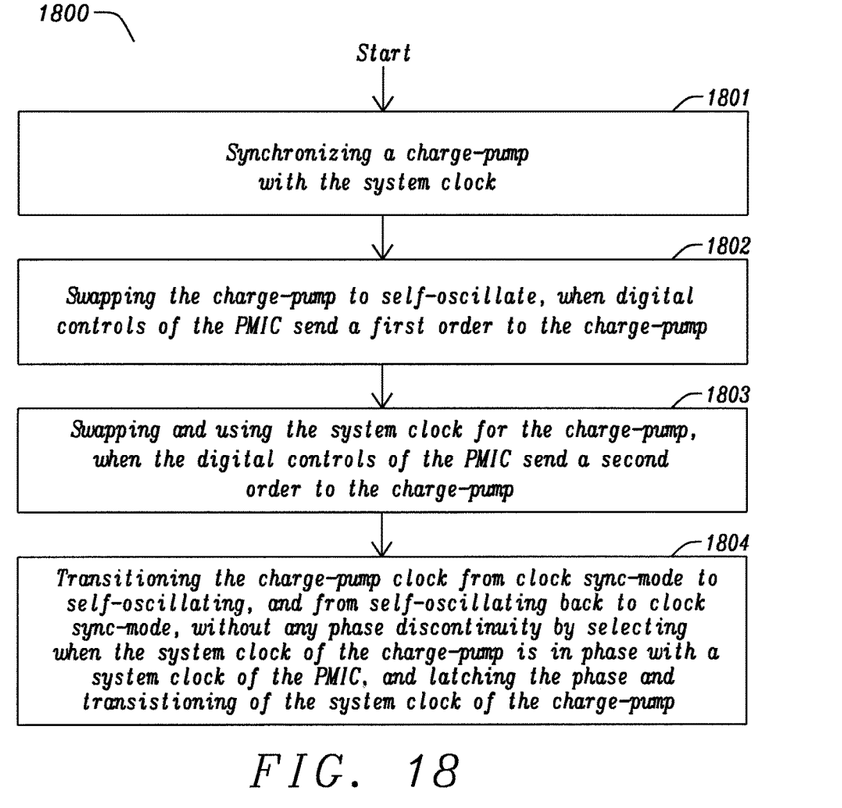
FIG. 18 shows a flowchart of a method disclosed for using the proposed Power Management Integrated Circuit (PMIC) to synchronize the charge-pump of the PMIC with the system clock, swap and self-oscillate, and then swap and uses the system clock again.

FIG. 18 shows flowchart 1800 of a method disclosed for operating a proposed Power Management Integrated Circuit (PMIC) to synchronize the charge-pump of the PMIC with the system clock, swap and self-oscillate, and then swap and use the system clock again. The proposed PMIC features the option to synchronize the charge-pump with the system clock 1801, and then to swap and self-oscillate and skip pulses 1802, when the digital controls of the PMIC send a first order to the charge-pump. The PMIC also features the option for the charge-pump to then swap and use the system clock again 1803, when the digital controls of the PMIC send a second order to the charge-pump. The designed transition of the clock from clock sync-mode to self-oscillate, and from self-oscillate back to clock sync-mode, does not present any phase discontinuity 1804.

Advantages

The advantages of one or more embodiments of the present disclosure include a PMIC digital system with a charge-pump in clock sync-mode that may leave clock sync-mode to self-oscillate and skip pulses. The charge-pump may self-oscillate forever, even under high-load. At the PMIC system level, this provides an advantage that if there is a sudden high-load on the charge-pump, the channel may continue in self-oscillation and the PMIC digital system has plenty of time to re-start the system oscillator. When the PMIC system needs to control the EMI, it sends the order to the charge-pump and the charge-pump re-synchronizes with the system oscillator without phase discontinuity. The major advantage of the disclosure is the very limited and simplified use of analog components. Only two RC delays are used for the self-oscillation. The rest of the system is digital. This saves design and layout resources.

While particular embodiments of the present disclosure have been illustrated and described, it will be understood by those skilled in the art that various changes in form and details may be made without departing from the spirit and scope of this disclosure.

What is claimed is:

1. A power management integrated circuit (PMIC), comprising:
 a.) a system clock;
 b) a PMIC control circuit configured to synchronize a charge-pump with the system clock;
 c.) in phase detection and latch circuitry for synchronization and resynchronization of said system clock with said charge-pump;
 d.) phase control multiplexers and associated delay circuitry for said self-oscillation; and
 e.) a finite state machine for latching said phase and phase transitions,
 wherein said charge-pump is configured to self-oscillate and no longer use said system clock, providing continuous phase at a first transition from clock sync-mode to self-oscillate, and
 wherein said charge-pump is configured to swap from said self-oscillating and resynchronize with said system clock, providing continuous phase when a second transition from self-oscillate back to clock sync-mode is made.

2. The PMIC of claim 1, further comprising:
 a.) a digital control circuit for programming changes to said system clock phase and frequency; and
 b.) flip-flops and associated delay circuits for receiving said system clock phase and frequency.

3. The PMIC of claim 1, further comprising a phase detector, 2 multiplexers, and a latching circuit, wherein said phase detector is configured to wait for a phase such that two clock signals are within a time window of being in phase before said multiplexer operation is completed on said first and second transitions.

4. The PMIC of claim 1, wherein said Power Management Integrated Circuit is configured to latch a phase and said first and second transitions, ensuring that there is no sudden drop or rise in an output voltage of said charge pump when said system clock is switching.

5. The PMIC of claim 1, wherein said Power Management Integrated Circuit is configured to send a PMIC control circuit signal to said charge-pump to self-oscillate.

6. The PMIC of claim 1, wherein said Power Management Integrated Circuit is configured to send said PMIC control circuit signal to said charge-pump to resynchronize with the system clock.

7. The PMIC of claim 1, wherein said charge pump is comprised of capacitors, for step down or step up conversion, and switches, corresponding to the phase operation of said capacitors.

8. The PMIC of claim 1, wherein said charge pump further comprises N phases, such as N is a positive integer, being either equal or having different durations to optimize said capacitor discharge.

9. A method of operating a power management integrated circuit (PMIC), comprising the steps of:
 a.) synchronizing a charge-pump with a system clock;
 b.) swapping said charge-pump to self-oscillate, when a digital control circuit of said PMIC sends a control signal with a first magnitude to said charge-pump;
 c.) swapping and using said system clock for said charge-pump, when the digital controls circuit of said PMIC sends the control signal with a second magnitude to said charge-pump; and
 d.) transitioning said charge-pump from clock sync-mode to self-oscillating, and from self-oscillating back to clock sync-mode, without phase discontinuity, by selecting when said system clock of said charge-pump is in phase with a system clock of said PMIC, and latching the phase and transitioning of said system clock of said charge-pump.

10. The method of claim 9, further comprising:
a.) receiving said system clock, with phase and frequency, to said charge-pump; and
b.) detecting and latching a phase of said system clock.

11. The method of claim 9, wherein said PMIC operates to monitor said system clock of said charge-pump and delay said system clock of said charge-pump for transition of said clock from clock sync-mode to self-oscillate, and from self-oscillate back to clock sync-mode.

12. The method of claim 9, wherein said PMIC makes a multiplexer selection based on a transition of said system clock of said charge-pump from clock sync-mode to self-oscillate, and from self-oscillate back to clock sync-mode.

13. The method of claim 9, wherein said PMIC latches a phase and transition of said system clock of said charge-pump from clock sync-mode to self-oscillate, and from self-oscillate back to clock sync-mode to ensure there is no sudden drop or rise in an output voltage of said charge-pump.

* * * * *